United States Patent [19]

Dooley et al.

[11] 4,227,403
[45] Oct. 14, 1980

[54] CYLINDER PRESSURE MONITORING SYSTEM

[75] Inventors: Daniel J. Dooley, Burr Ridge; Terrence L. Dooley; Joseph L. Dooley, both of Chicago, all of Ill.

[73] Assignee: Creative Tool Company, Lyons, Ill.

[21] Appl. No.: 7,347

[22] Filed: Jan. 29, 1979

Related U.S. Application Data

[63] Continuation-in-part of Ser. No. 960,590, Nov. 14, 1978, abandoned.

[51] Int. Cl.³ .......................................... G01M 15/00
[52] U.S. Cl. .................................. 73/115; 73/119 A
[58] Field of Search ..................... 73/119 A, 115, 116, 73/753, 754; 310/338

[56] References Cited

U.S. PATENT DOCUMENTS

| 4,109,518 | 8/1978 | Dooley et al. | 73/119 A |
| 4,130,013 | 12/1978 | Bailey et al. | 73/119 A |

Primary Examiner—Jerry W. Myracle
Attorney, Agent, or Firm—Neuman, Williams, Anderson & Olson

[57] ABSTRACT

Disclosed is a transducer assembly and diagnostic apparatus for processing an electrical signal which varies with the pressure changes occurring within an engine cylinder. The transducer assembly consists of a U-shaped structure integrally formed in a sandwich arrangement and encompassing a pressure-responsive crystalline element. The assembly is sized such that it substantially encompasses the shank of a spark or glow plug of the engine such that axial forces from within the cylinder excite the transducer through the plug to produce a signal which is processed in an electrical circuit to provide timing or other diagnostic information.

16 Claims, 5 Drawing Figures

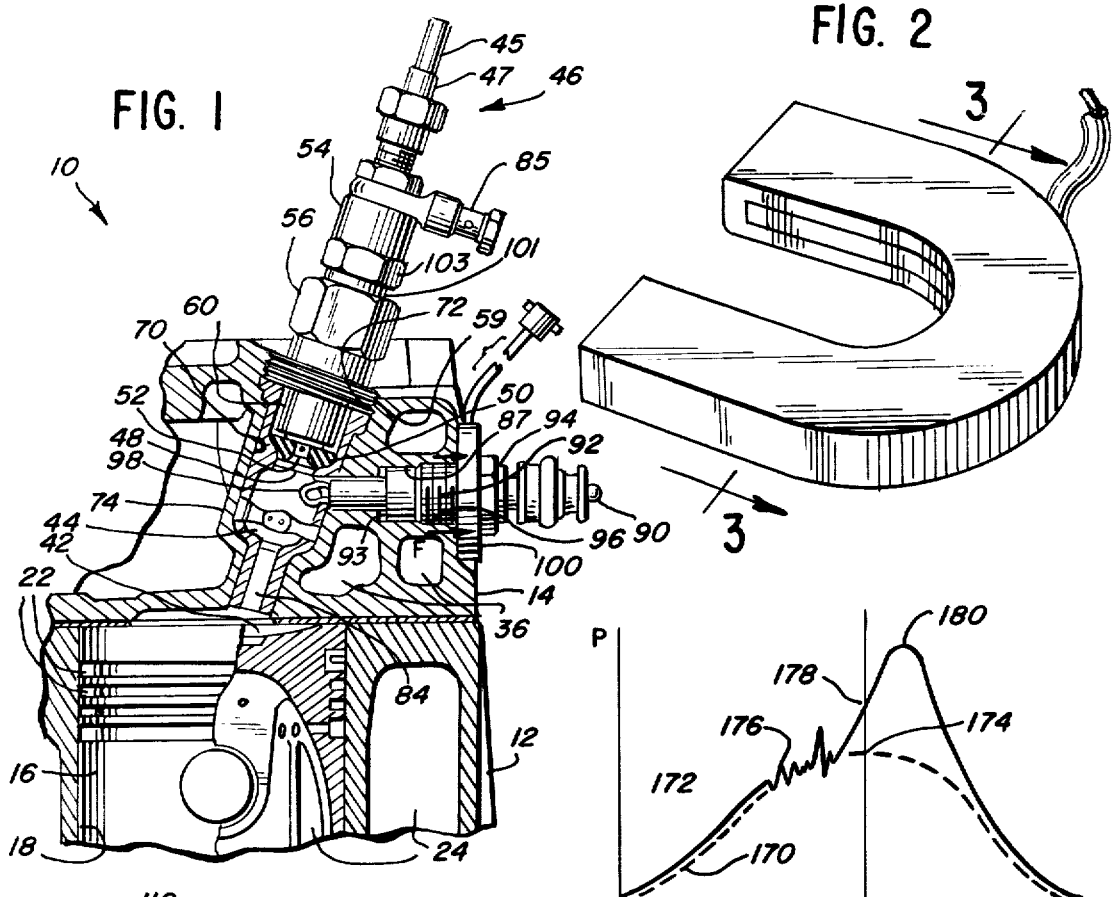
FIG. 1
FIG. 2
FIG. 4
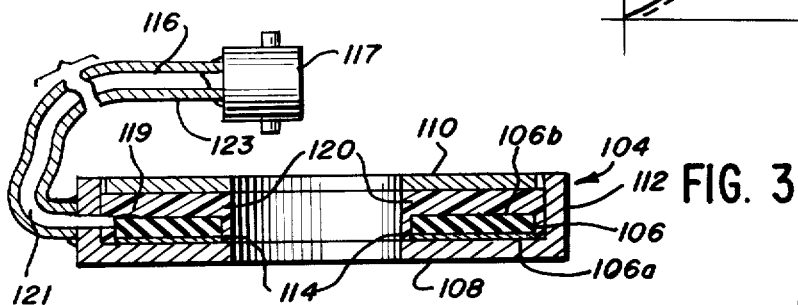
FIG. 3
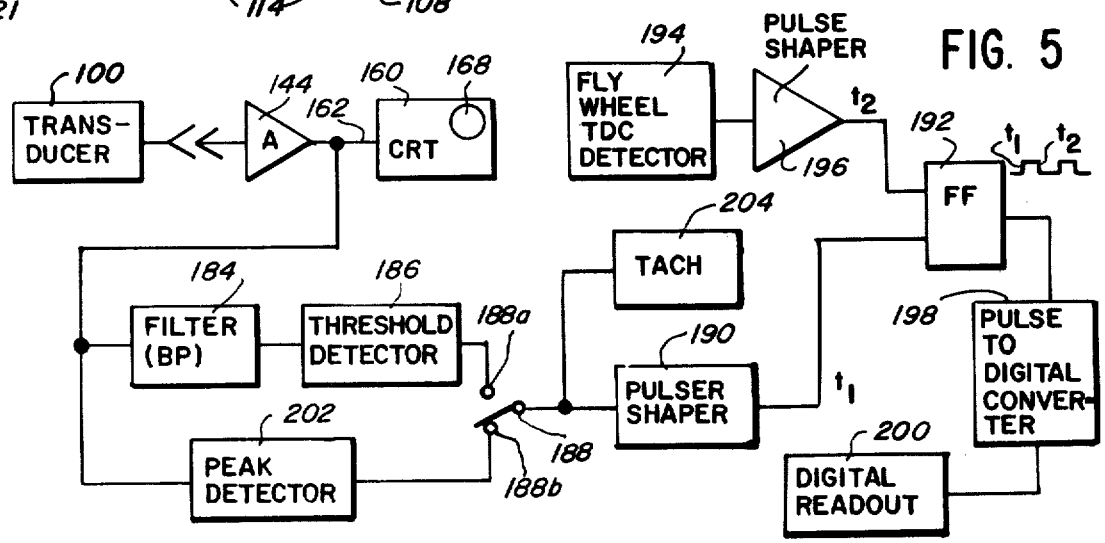
FIG. 5

CYLINDER PRESSURE MONITORING SYSTEM

This application is a continuation-in-part of applicants' application Ser. No. 960,590 filed on Nov. 14, 1978, now abandoned.

FIELD OF THE INVENTION

This invention is generally related to diagnostic systems for internal combustion engines and more particularly concerns diagnostic systems which utilize pressure-indicative signals from the engine cylinders.

BACKGROUND OF THE INVENTION

With the increasing popularity of fuel injection in both diesel and carbureted engines and with the increased emphasis on gas mileage and emission controls, the need to derive accurate information concerning the performance of each engine cylinder has rapidly increased. However, until recent years, great difficulty has been encountered in attempts to obtain accurate information concerning the internal performance of the cylinder during the combustion process. Numerous transducers have recently been devised by the applicant and others for developing the necessary signals from the engine cylinder to be used for diagnostic purposes. For example, U.S. Pat. No. 4,036,050 of applicant Joseph Dooley and Edward Yelke discloses transducers which operate in conjunction with the hold-down apparatus for injector nozzles of the type utilizing clamps or dogs to hold the nozzle in seating engagement with the engine block or head or in conjunction with a screw-in type injector nozzle of the type which is threaded into the engine housing or otherwise secured to the housing by screw-type fittings which are coaxial with the nozzle itself. In some engines, however, the nozzle apparatus is not readily accessible or is of such a shape and size as to make it difficult to adapt existing transducer structures to it. The applicants have discovered that pressure variations from within the cylinder can be alternately detected through the aperture normally provided for glow plugs in many diesel engines or for spark plugs in carbureted engines. Diesel glow plugs are threaded through the engine walls into the combustion or precombustion chamber to provide heat from an electrical filament to warm the chamber and thereby enhance the ignition and combustion within the cylinder during cold starting.

For diesel engines utilizing such glow plugs, the applicants have developed a transducer assembly which screws into the engine block in the receptacle normally provided for the engine glow plug. This glow plug replacement transducer is disclosed in the copending application Ser. No. 960,600 filed on Nov. 14, 1978 and entitled Combustion Monitoring System For Fuel Injected Engines. This transducer has also proven quite effective in developing a signal proportional to pressure variations occurring within the engine cylinder during the combustion process. However, the glow plug must still be removed for replacement by the transducer. The present invention eliminates the need for removal of the glow plug while still making possible the detection of pressure variations within the cylinder that are reflected through the passage normally provided for the glow plug. As such, the present invention provides for dynamic timing of the engine at all times and temperatures and under any conditions existing in the field or the laboratory. More important, the transducer assembly of the present invention may, if desired, be permanently attached to the engine to continuously provide information from the engine cylinder to on-board monitoring or control apparatus.

Other transducers for developing pressure-related information from the cylinder through specially modified plugs have been disclosed in the 1978 SAE Journal No. 0098-2571/8605-0054. These transducers have not found wide applicability in that they generally require modifications to existing engine components and are suited primarily for the laboratory.

It is a general object of the present invention to overcome the drawbacks and deficiencies of the prior transducers and diagnostic systems through the provision of a transducer assembly which is specially adapted for use with glow plugs of the screw-in or threaded type. More specifically, it is an object of the invention to provide such a specially adapted transducer assembly in a form that can be utilized without interfering with the normal operation of the associated glow plug.

It is a related object of the invention to provide a transducer and diagnostic system which can be utilized dynamically to develop information concerning the activity within the cylinder during normal operation of the engine, at all times and temperatures and under any conditions existing in the field or laboratory.

It is still a further object of the present invention to provide a diagnostic system which is economical to build and easy to use both in the laboratory and in the field.

It is still a further object of the invention to provide a transducer assembly and associated circuitry which is adaptable to a wide variety of different engines and which can be installed in a permanent or semi-permanent fashion for continuous use within the vehicle.

SUMMARY OF THE INVENTION

These and other objects of the present invention are achieved through the provision of a transducer having the shape of a generally U-shaped wafer or sandwich for insertion around a spark or glow plug. The transducer has a piezoelectric crystalline slab located between protective steel surfaces and develops an output signal in proportion to the mechanical stress exerted thereon. The thickness of the transducer is such that when the transducer is inserted between the engine and the enlarged hex flanges of the glow plug, the glow plug seats against the transducer rather than against the internal recesses of the engine and, accordingly, pressures developed within the cylinder are transmitted directly to the piezoelectric element to develop an extremely sensitive signal representative of those pressures. Since the glow plug remains tightly fitted into the compression head during use of the transducer, normal operation of the engine and the glow plug continues while signals are being developed by the transducer. A transducer having a U-shaped configuration is especially well adapted to be quickly and easily inserted on and removed from the glow plug without removal of the plug itself. The circuitry associated with the transducer is especially adapted to utilize the information available on the cylinder pressure signal including the oscillations developed during opening of the injector nozzle and the high amplitude of the signal developed at the instance of peak firing pressure within the cylinder. Various alternative timing and control devices are disclosed below.

For a more complete understanding of this invention reference should now be made to the embodiment illustrated in greater detail in the accompanying drawings and described below by way of an example of the invention.

BRIEF DESCRIPTION OF THE DRAWINGS

FIG. 1 is a partial cross section of a view of the cylinder head assembly of a conventional diesel engine having a glow plug inserted for ignition and warm-up and with a transducer assembly constructed in accordance with the present invention inserted around the glow plug.

FIG. 2 is an enlarged perspective view of the transducer assembly shown in FIG. 1.

FIG. 3 is an enlarged cross sectional view of the transducer assembly shown in FIG. 2 taken along the line 3—3.

FIG. 4 is a pressure-time curve illustrating the electrical signal developed by the transducer assembly shown in FIGS. 1-3.

FIG. 5 is a block diagram of an electrical circuit and read out apparatus for processing the electrical signal shown in FIG. 4 derived from the transducer of FIGS. 1-3.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWINGS INCLUDING PREFERRED EMBODIMENTS

Turning first to FIG. 1, there is shown a section of a typical diesel engine 10 which consists generally of a block assembly 12 and compression head 14. The block is shown cut away to reveal a piston 16 which operates in a cylinder 18. The piston is coupled to a crankshaft (not shown) via a connecting rod and has a plurality of rings 22 which operate in a conventional manner to maintain compression and enhance lubrication within the cylinder 18.

The compression head 14 includes an air intake system (not shown) which provides air for the combustion process through the operation of a conventional valve mechanism which opens and closes an air inlet port under the control of appropriate linkage driven by other components of the engine. The compression head 14 also houses passages 36 for water or coolant flow to control the temperatures developed within the compression head. An airtight seal to define a combustion chamber 42 which expands and contracts in volume with vertical movement of the piston 16 within the cylinder 18 is formed by coupling the head 14 to the block assembly 12 by appropriate bolts and gaskets.

Fuel is provided to the pre-combustion chamber 44 of each cylinder by a fuel injector pump (not shown) through a fuel line 45 and screw-type nozzle assembly 46. The fuel line 45 is attached to the inlet 47 of the nozzle assembly 46.

The nozzle assembly 46 carries fuel from the fuel line to an inlet port 48 of the pre-combustion chamber 44. At the fuel inlet port 48 into the precombustion chamber is an injector gasket 50, typically in the form of a copper or brass washer surrounding a protruding portion or orifice 52 at the tip of the nozzle assembly 46.

There is depicted in the embodiment of FIG. 1 a screw-in type nozzle assembly 46 having a body portion 54 with an expanded hex portion 56, a threaded shank portion 59 and an injection valve assembly 60. For the purpose of seating the screw-type nozzle assembly 46 in sealing engagement with the inlet port 48 of the precombustion chamber 44 there is provided a nozzle assembly receptacle 70 having a threaded portion 72 in the compression head 14 and adapted to enter into a screw-type engagement with the threaded shank portion 58 of the nozzle assembly 46 and to thereby maintain axial pressure thereon. The nozzle hex portion 56 is integral with the threaded shank portion 58 and is a convenient means for gripping the nozzle assembly 46 as it is screwed into engagement with the threaded portion 72 of the receptacle 70.

A pre-combustion housing 74 is compression fitted into the inner part of the receptacle 70. The nozzle assembly 46 is inserted into the receptacle 70 and extends toward the pre-combustion housing 74. The nozzle assembly 46 is screwed into the receptacle 70 until its forward end seats against the fuel inlet port 48. The remaining space within the pre-combustion housing 74 serves as the pre-combustion chamber 44, and a channel 84 connects the pre-combustion chamber 44 to the combustion chamber 42.

The nozzle assembly 46 may be any of a variety of different types. Typically, injector nozzles include an internal spring-loaded valve which is hydraulically opened by the fuel provided by the pump as the pressure exerted by that fuel exceeds a predetermined minimum level. As such, the nozzle assembly isolates the fuel line from pressures created in the pre-combustion chamber 44 during most of the combustion cycle. Although not relevant to the present invention, it is noted that most injector nozzles additionally provide a metering function in that the volume of fuel for a given injection cycle is carefully controlled and excess fuel supplied by the pump is bypassed back to the fuel supply through a return line 85 shown in FIG. 1.

As shown in FIG. 1, a second receptacle 87 formed in the head 14 is adapted to accept a glow plug 90. The glow plug 90 has a partially threaded shank portion 92 of gradually reduced diameters extending into the pre-combustion chamber 44. The plug also has an expanded head portion 94. The receptacle 87 extends from the pre-combustion chamber 44 to the outside of the compression head 14 and includes a threaded portion 96 for a screw-type engagement with the threaded portion 92 of the plug shank. The glow plug 90 is screwed into the receptacle 87 until the plug seats, as will be described in greater detail below. A filament 98 at the forward end of the glow plug 90 is electrically coupled by means of a conductor (not shown) within the glow plug 90 to a suitable electrical power source. The activated filament 98 heats the air within the pre-combustion chamber 44 and thereby assists in igniting the fuel in cold weather when diesel engines often experience starting problems.

In normal operation of the diesel described, air supplied to the cylinder 18 through the air inlet port is compressed during upward movement of the piston 16. After closure of the air inlet port but while compression is still increasing within the cylinder 18, the injector pump supplies fuel to the fuel line. When the pressure of the fuel within the fuel line is sufficient to open the spring-loaded valve in the nozzle assembly 46, ejection of fuel into the pre-combustion chamber 44 and from there into the combustion chamber 42 begins. The combination of heat and pressure within the combustion chamber 42 ignites the fuel, resulting in a still further and more rapid increase in pressure to begin the power stroke which forces the piston 16 downward in the cylinder 18.

In accordance with the present invention, means are provided to monitor these pressure changes within the pre-combustion chamber 44 so as to provide an electrical signal which is useful in monitoring engine performance or performance within the individual cylinder. More specifically, a transducer assembly 100 of appropriate sensitivity is coupled to the glow plug 90. Axial forces on the transducer assembly 100 created by pressure changes within the pre-combustion chamber 44 are thereby detected external to the engine housing to facilitate convenient and economical performance monitoring. More specifically, the stress transducer 100 of the embodiment depicted in FIG. 1 is inserted around the shank 92 of the glow plug 90 between the enlarged hex portion 94 and the lateral face of the compression head.

As shown in more detail in FIGS. 2 and 3, the transducer 100 is in the form of U-shaped structure having a metal housing 104 surrounding a U-shaped disc 106 of piezoelectric material. The transducer 100 is sized to fit around the glow plug 90 as described above, i.e., the opening between the legs of the U-shaped housing is sufficiently wide to straddle the shank portion of the glow plug while being sufficiently narrow to insure that the housing is substantially overlapped by the enlarged hex portion of the plug assembly. This insures that the transducer 100 is compressed between the enlarged head portion and the engine face. The housing 104 has interconnected bottom 108, top 110 and side members 112. The disc 106 of piezoelectric material is connected to the bottom 108 of the housing 104 by a conductive adhesive layer 114.

The positioning and bonding of the piezoelectric disc 106 within its receptacle is similar to that disclosed for the washer or 0-shaped transducer shown in FIGS. 6a and 6b of the aforesaid U.S. Pat. No. 4,036,050. The disc 106 is typically a ceramic crystal structure possessing piezoelectric properties, i.e., the ability to produce a voltage when subjected to a mechanical stress acting in a specific orientation with respect to the crystallographic axis of the material. Materials such as Mallory P.C. 5 or Clevite P.Z.T. 5 have proven suitable for this purpose. Typical materials of this type have two parallel major surfaces between which the stress-responsive voltage is developed. In the embodiment shown in FIGS. 2 and 3, the lower surface 106a of the disc 106 is bonded by a conductive adhesive 114 to the bottom 108 of the washer 100, while its upper surface 106b is electrically coupled by means of a coaxial cable 116 to monitoring apparatus (described below) through a BNC type electrical connector 117. The coaxial cable 116 connecting the crystal surface 106b to the connector 117 has an inner conductor 119 electrically bonded to the face 106b, an insulator 121 and an outer ground sheath 123 coupling the metal housing 112 to the exterior shell of the BNC terminal 117. The adhesive 114 bonding the disc 106 to the surface 108 is preferably of a type which maintains electrical contact between the disc 106 and the surface 108 through the wide variations of temperature encountered during normal operation of the engine. Mounted on the surface 108 as described, the disc 106 is flexed or bent as a result of axial pressures acting along the body of the shank 92 during pressure changes within the combustion chamber 42. At the same time, pressures exerted radially from within the shank 92 have little or no effect on the disc 106. Likewise, vibration from the engine itself has been found to have little or no effect on the signal developed by the transducer. In other words, the output signal developed by the disc 106, as shown in FIG. 5, is closely representative of actual cylinder pressure changes. A detailed discussion of this signal is presented below. The piezoelectric surface 106b is held in compression and insulated from the remainder of the housing 104 by a filler 120 of nonconductive material such as epoxy or the like.

The transducer 100 may be formed in a variety of different shapes within the scope of the present invention. Whereas the outer shell portion 108 is shown in a general U-shape, the shell could also be square, rectangular, oval or any of a variety of other planar shapes so long as the opening for surrounding the nozzle or plug shank is properly sized. It has been found desirable, however, to keep the size of the transducer relatively small and substantially symmetrical about its center axis so that its mass does not cause spurious signals from the piezoelectric element due to flexure of the housing during vibrations of the engine.

If the transducer 100 is U-shaped, insertion on and removal from the glow plug is greatly facilitated. Ease of insertion and removal is an important factor for detecting pressure variations in the cylinder under the wide range of possible conditions existing in the field.

In the absence of the transducer 100, the glow plugs of diesel engines, as well as spark plugs in carbureted engines, seat internal to their receptacle along the periphery of an internal surface of the plug such as the surface 93, the enlarged head portion of the plug serving primarily to facilitate engagement of the plug by a wrench. In the present instance, however, the thickness of the transducer 100 must be sufficient to insure that the enlarged head portion of the glow plug seats firmly against the transducer assembly 100 so as to compress the transducer against the flat outer face of the compression head. Properly sized, the transducer 100 is thick enough to just prevent the normal seating of the plug against the internal surfaces of the plug receptacle while being thin enough to allow the plug to extend far enough into its receptacle so as to facilitate normal operation of the plug. In this manner it is insured that the full force exerted on the glow plug during tightening into its receptacle impacts on the transducer assembly 100 as shown by the force arrow F in FIG. 1. Any pressure created within the cylinder thus momentarily relaxes the seating pressure exerted on the transducer 100 by the enlarged hex head portion of the glow plug. This momentary relaxation of the pressure on the transducer 100 creates flexure of the piezoelectric element 106 to produce the desired output signal on the line 116. Signals created in this manner have been found to be highly representative of pressure variations within the cylinder.

Various filler pieces or stand-off devices may be provided between the transducer and the outer face of the engine to insure that a flat surface is provided against which the piezoelectric transducer 100 may be compressed. These devices may be integral with or separate from the transducer housing.

For the purpose of utilizing the transducer output signal to provide a visual indication of engine performance, various output devices including a CRT display, tachometer and timing circuits, as shown in FIG. 5, are provided. The transducer 100 provides an output pulse during each power cycle of the engine. Because a piezoelectric transducer is sensitive to electrical loading, an isolation amplifier 144 having a high-impedance input is provided to receive the signal from the transducer 100. For diagnosing problems arising within the cylinder 18, the pressure-time characteristic during the power cycle of the individual cylinder 18 is of interest. The transducer apparatus of the present invention is of particular value for the more demanding monitoring applications where an accurate tracking of cylinder pressure variations is important. To this end the circuit of FIG. 5 is shown with an output indicator in the form of a CRT display 160 having an input 162 coupled to receive the output of the isolation amplifier 144 for display on a conventional CRT screen 168. The display may be a standard oscilloscope or any other display having a capability to synchronize automatically to the time base of the input signal. Alternately the display may have its horizontal sweep triggered from or synchronized to an externally developed signal such as may be derived from the flywheel pick-up disclosed below or from various timing pulses existing within the transducer output signal itself. The signal appearing on the screen 168 during monitoring of a properly operating cylinder 18 is shown in the pressure-time trace of FIG. 4, wherein the voltage developed from the transducer 100 is the ordinate and time is the abscissa. A grid impressed on the screen 168 provides proper calibration. The amplitude of the signal at any given point above the zero axis represents instantaneous pressure within the cylinder 18. This amplitude can be compared against known standards to ascertain the performance of rings and valves in maintaining compression.

The pressure-time curves shown in FIG. 4 represent performance of the same cylinder under two separate conditions. The broken line or curve 170 represents the signal monitored on the screen 168 during operation of the cylinder 18 with the fuel source to the cylinder 18 interrupted, while the solid line or curve 172 represents the signal monitored on the screen 168 with the fuel injection system for the cylinder 18 operative. From the broken-line trace 170 it is seen that during interruption of the fuel source to the cylinder 18 the transducer 100 develops a signal, viewable on the screen 168, which represents the pressure change within the pre-combustion chamber 44 and combustion chamber 42 (FIG. 1) resulting only from the contraction and expansion of the volume of the chamber 42 during one cycle of the piston 16. The point at which the piston 16 achieves the position of top dead center (TDC) can be seen to occur when the pressure is at its highest point, as indicated at 174 in FIG. 4. For timing purposes the point TDC has substantial significance.

When the fuel injection system is operative, a substantially different signal is developed by the transducer 100 and viewable on the screen 168. The trace or curve 172 rises similar to the curve 170 during upward travel of the piston 16 and before fuel injection. A high frequency oscillation, typically at 2000 to 3000 Hz., indicated at 176, occurs as a result of spring chatter in the injection nozzle 46 during the nozzle opening period. Absence of this chatter is an indication of a faulty nozzle. Observance of a change in these oscillations or a shift in time of these oscillations with respect to the time of TDC is also indicative of a faulty nozzle. As fuel is injected into the cylinder 18, the amplitude of the pressure-time curve increases rapidly, as shown at 178, until peak firing pressure occurs at point 180. If an injector nozzle 46 is leaking or opening at insufficient pressure or has a clogged orifice, the amplitude of the transducer signal is reduced substantially from the norm to indicate a pressure only slightly higher than the cylinder pressure without injection.

Still further information can be obtained by providing each of the cylinders of an engine with a separate transducer and by viewing the output signals from each cylinder on separate traces of a single scope using a common time base synchronized to the signal from any one of the cylinders. Relative timing and amplitude information for each signal may be viewed on the CRT screen to give a valuable indication of trouble spots or excessive wear in one or more cylinders which might result in deteriorating performance from the engine as a whole.

The transducer of the present invention has been found to develop a far cleaner, less noisy and hence more accurate electrical representation of the pressure variations within the cylinder head than had been available with previous transducers known to the inventors.

To utilize the unusually high quality of the pressure signal developed herein, circuit-means have been provided for extracting and utilizing the important timing information available from the signal and in particular the indications of nozzle opening "chatter" and peak firing pressure that exist on the transducer output signal. To this end, the circuitry shown in FIG. 5 includes circuits for processing the signal derived from the transducer in alternate paths. The first path of processing includes a filter 184 of the bandpass variety which is adapted to separate the audio frequency oscillations (2000–3000 hertz) that result from the nozzle "chatter" during opening. In this mode of operation, termed the "nozzle opening advance mode," or OA mode, the output of the filter 184 is fed through a threshold detector 186 which produces an output pulse only if the level of activity in the desired frequency range detected by the bandpass filter 184 is above a predetermined minimum. The output pulse from the threshold detector 186, therefore, rises at the beginning of the opening of the injector nozzle and falls at the completion of the opening of the injector nozzle. Once the nozzle is fully opened, the "chatter" subsides. In this OA mode this nozzle opening signal is selectively gated through contact 188a of a single-pole double-throw switch 188 to a pulse shaper 190 and thence to one input of a flip-flop 192. The other input to the flip-flop 192 is provided by a pulse derived from a flywheel attachment 194 for detecting the top dead center position on the flywheel. Typically, the flywheel top dead center position is indicated by an irregularity such as a mark or a raised portion on the flywheel which is detectable by an inductive or optical detector mounted to the flywheel housing. The signal from the flywheel TDC detector 194 is shaped in an amplifying pulse shaper circuit 196 prior to its transmission to the flip-flop or bistable circuit 192. The output from the bistable circuit 192 is in the shape of a pulse having a width which is proportional to the time delay between nozzle opening and the achievement of the top dead center position by the flywheel of the engine. This pulse is fed to a pulsewidth-to-digital converter 198 which in turn drives a digital or analog readout 200 to provide the operator with an indication of nozzle opening advance. What has been described thus far is the injection "OA" mode of operation.

The pulsewidth-to-digital converter circuit may be a simple integrator plus an analog-to-digital converter. Another pulsewidth-to-digital converter circuit gates high frequency clock pulses to a binary counter during the duration of the output pulse from the bistable circuit 192. Thereafter the digital readout 200 provides a decimal number on a suitable visual display to the operator. The output may be calculated in degrees of crankshaft rotation or in milliseconds of actual delay, depending on the application.

An alternate mode of operation, the "peak delay" or "PD" mode, is also provided by the circuitry of FIG. 5. For this purpose a suitable peak detector circuit 202 is provided for producing an output pulse upon occurrence of the maximum amplitude of the signal derived from the transducer and hence the peak firing pressure within the cylinder. The output from the peak detector 202 is fed to the alternate active contact 188b of the manual switch 188, from which it is selectively coupled to the pulse shaper 190 and processed in the manner previously described for the "opening advance" or OA mode of operation. However, since the peak firing pressure normally occurs after the engine has achieved the top dead center position, the flip-flop or bistable circuit 192 will normally be toggled first by the signal derived from the flywheel TDC detector 194 and thereafter reset to its original state at the time $t_2$ by the output from the pulse shaper 190. Suitable provision is made in the pulse-to-digital converter 198 and digital readout 200 to indicate to the operator whether the signal he is reading is an advance or delay signal.

A conventional tachometer circuit and readout 204 is coupled to the common output lead of the selector switch 188 and provides an accurate indication of engine speed so long as a single pulse is received by it during each revolution of the crankshaft. Accordingly, the tachometer will provide an accurate indication of engine speed whether it is driven by the output from the bandpass filter 184 or from the peak detector 202. In any event, the provision of a tachometer alone or simultaneous with an indication of either the nozzle opening advance or peak firing delay gives a valuable indication of engine performance.

As still a further combination of components within the scope of the present invention, the transducer may be combined with and provide a signal to the timing circuitry shown in the copending application of Edward Yelke Ser. No. 913,826 filed June 8, 1978 now U.S. Pat. No. 4,185,494. The disclosure of the timing circuit in that application is incorporated herein by reference. In this latter combination, the transducer is utilized to effect the selectively delayed strobe of the timing light in a manner more fully described in the aforesaid Yelke application.

Since the transducer of the present invention does not interfere with the normal operation of the engine cylinder which is being monitored, a wide variety of new diagnostic applications are made possible. For example, a semi-permanent installation of the transducer 100 to a plug could be combined with an on-board digital counter for tallying engine revolutions. For warranty purposes the counter output could be monitored on a readout in decimal or coded form or stored for readout by the dealer or factory at the time a warranty claim is made. Similarly, the transducer may be installed as part of an on-board computing system for automatically correcting pump advance, as desired, for maximum fuel economy, for maximum power, or for ease of starting. For this application the readout 200 is replaced by a suitable computing device plus appropriate mechanical linkage, servos or other drivers to control injection pump advance.

From the foregoing, it is seen that there has been brought to the art in the present invention monitoring apparatus which is at the same time inexpensive and highly effective in detecting pressure changes internal to a fuel-injected cylinder. In addition, the method and apparatus disclosed herein is applicable or adaptable to a wide variety of engines, including both diesel and carbureted engines, and requires no modification of existing engine components.

While the invention has been described in connection with certain preferred embodiments, it will be understood that it is not intended that the invention be limited to those embodiments. On the contrary, we intend to cover all alternatives, modifications and equivalents as may be included within the spirit and scope of the invention as defined by the appended claims.

What is claimed is:

1. A transducer for developing an electrical signal in response to pressure variations within the combustion chamber of an engine of the type having (a) a threaded port extending from the combustion chamber to the outer surface of the engine and (b) a glow or spark plug having a shank portion threaded into said port and an enlarged head portion exterior to said shank portion, said transducer comprising:

a housing sized and shaped for insertion around said shank portion while underlying said enlarged head portion, said housing having a thickness sufficient to insure that said glow or spark plug head portion compresses said housing against said engine and seats against said housing;

a piezoelectric element disposed within said housing for developing an electrical signal in response to pressure variations on said glow or spark plug from within said combustion chamber; and terminal means for transmitting the electrical signal from said piezoelectric element.

2. The transducer of claim 1 wherein said housing is substantially flat.

3. The transducer of claim 1 wherein said housing is U-shaped.

4. The transducer of claim 3 wherein said piezoelectric element is U-shaped.

5. A transducer for developing an electrical signal in response to pressure variations within the combustion chamber of an engine of the type having a port which is at least partially threaded extending from said combustion chamber through the engine and a glow or spark plug having a shank portion threaded into said port and an enlarged head portion, said transducer comprising;

a substantially flat U-shaped element sized and shaped for insertion around the shank portion of said glow or spark plug while substantially underlying the expanded head portion of said glow or spark plug, said U-shaped element being of sufficient thickness to insure that the enlarged head portion of said plug seats firmly against said element;

a piezoelectric crystalline element sandwiched within said U-shaped element for producing an electrical signal in response to axial pressure variations on said glow or spark plug from within said combustion chamber; and output terminal means for transmission of said electrical signal.

6. In combination with a diesel engine of the type having a combustion chamber associated with each cylinder and a threaded port from each combustion chamber to the outer surface of the engine into each of which is inserted a glow or spark plug having a shank portion threaded into said port and an enlarged head portion exterior to said shank portion and a transducer for developing an electrical signal in response to pressure variations within a combustion chamber, said transducer comprising a housing sized and shaped for insertion around said shank portion and underlying said enlarged head portion, said housing having a thickness sufficient to insure that said glow or spark plug head portion compresses said housing against said engine and seats against said housing;

a piezoelectric element disposed within said housing for developing an electrical signal in response to pressure variations on said glow or spark plug from within the combustion chamber; and terminal means for transmitting the electrical signal from said piezoelectric element.

7. A monitoring system for fuel injected engines of the type having a spark or glow plug with an expanded head portion and a shank portion threaded into a port extending through the engine into the cylinder combustion chamber, said monitoring system comprising:

a transducer assembly having a size and shape for surrounding said shank portion while underlying said head portion and a thickness sufficient to prevent said plug from seating internal to said port such that said transducer assembly is compressed by said expanded head portion against the engine so as to develop an electrical signal containing information corresponding to changes in axial pressure on said spark or glow plug from within said combustion chamber;

circuit means for processing said electrical signal; and output indicating means coupled to said circuit means for providing a visual indication of at least a portion of said pressure information.

8. The monitoring system of claim 7 wherein said output indicating means includes a cathode ray tube for visually displaying said combustion chamber pressure information.

9. The monitoring system of claim 7 wherein said circuit means includes means for converting the pressure changes created during successive engine revolutions into a pulse train having a frequency proportional to engine speed and wherein said output indicating means is a tachometer for receiving said pulse train and providing a visual indication of engine speed.

10. A method for dynamically monitoring the performance of an internal combustion engine of the type having at least one spark or glow plug threaded into a receptacle which extends from the outside of the engine into a cylinder combustion chamber and which plug has an enlarged head portion exterior to said engine, said method comprising the steps of:

at least partially unscrewing said plug from its receptacle so as to unseat said plug from the engine;

inserting around said plug a pressure responsive transducer which is shaped to fit around said plug between said enlarged plug head portion and the outer face of said engine;

screwing said plug back into its receptacle until the enlarged head portion compresses said transducer against the outer face of said engine so that axial pressures on said plug from within said cylinder create pressure variations on said transducer which generate a transducer output signal.

11. The method of claim 10 further including the steps of processing said transducer output signal to develop information concerning the performance of the cylinder being monitored; and displaying such information.

12. A transducer assembly for developing an electrical signal indicative of pressure variations within the combustion chamber of an engine of the type having (a) an at least partially threaded port extending from said combustion chamber to the exterior of said engine and (b) a spark or glow plug threaded into said port and having a shank portion extending into said receptacle and an enlarged head portion exterior to said engine, said assembly comprising spacer means adapted to be compressed between said enlarged plug head portion and the exterior of said engine, said spacer means having sufficient thickness to prevent seating of said shank portion interior to said engine port; and a pressure responsive transducer element coupled to said spacer means and compressable therewith between said enlarged plug head portion and said engine so as to develop an electrical signal in response to pressure variations acting axially along said plug.

13. The transducer assembly of claim 12 wherein said spacer means is a U-shaped wafer and said transducer element is sandwiched within said wafer.

14. The transducer assembly of claim 12 wherein said spacer means is a single composite member integral with said transducer element.

15. The transducer assembly of claim 12 wherein said spacer means includes a first element of a fixed thickness and a second element of a variable thickness to insure seating of said enlarged head portion against said transducer element.

16. The transducer assembly of claim 12 wherein said spacer means includes a first element to which said transducer element is affixed and at least one additional element for adjusting the thickness of the spacer means to insure compression of said transducer element by said enlarged plug head portion.

* * * * *